June 9, 1964 E. F. BONNER 3,136,747
CONTINUOUS PROCESS FOR POLYMERIZING POLYETHYLENE
Filed Aug. 29, 1958 2 Sheets-Sheet 1

INVENTOR.
EUGENE F. BONNER
BY
Walter C. Kehm
ATTORNEY

United States Patent Office 3,136,747
Patented June 9, 1964

3,136,747
CONTINUOUS PROCESS FOR POLYMERIZING POLYETHYLENE
Eugene F. Bonner, Fanwood, N.J., assignor to Union Carbide Corporation, a corporation of New York
Filed Aug. 29, 1958, Ser. No. 757,974
8 Claims. (Cl. 260—94.9)

This invention relates in general to polymerization processes, and more particularly to the polymerization of ethylene. Even more particularly it relates to a continuous process for the polymerization of ethylene to form normally solid polyethylene characterized by having a large percentage of moderately high molecular weight polymer chains and a high density.

The polymers of ethylene are dependent for their properties, in the main, upon the physical conditions under which the polymerization is carried out and upon the particular catalyst employed. Frequently the catalyst material is the dominant factor—dictating certain temperatures and pressures only which permit economical operation and determining which extraneous materials or impurities such as oxygen and water can be tolerated if a polymer having the desired properties is to be obtained.

The polyethylene with which the present invention is concerned is normally solid, has a high density, and is highly linear. It is generally characterized by having a methyl group content not in excess of 0.3 percent, a total content not in excess of 10 percent by weight of low molecular weight ethylene polymers having an intrinsic viscosity in tetralin between 0.0 and 0.4, and a total content not in excess of 5 percent by weight of high molecular weight ethylene polymers having an intrinsic viscosity in tetralin of about 3.8. The density of the polymer at 23° C. is in the range of about 0.94 to about 0.97. As a rule, less than 1.0 percent by weight of these polymers is soluble in boiling cyclohexane.

The methods heretofore utilized for the production of the desired polyethylene having the above-described properties may properly be characterized as batch type processes. In general the methods comprise feeding ethylene monomer substantially free from acetylene, ketones, water, oxygen, sulfur, active hydrogen, etc. into an autoclave equipped with stirring means, said autoclave having initially been charged with the entire quantity of catalyst anticipated to be required along with a suitable inert hydrocarbon solvent therefor, and polymerizing the ethylene monomer at temperatures of about 10° C. to about 140° C. and at pressures ranging from sub-atmospheric to about 50 p.s.i.g. After polymerization has substantially ceased, the entire reaction mass of catalyst, solvent, and polymer, which is in the form of irregular size particles is quenched with an alcohol such as isopropanol to remove traces of occluded catalyst.

The operation of a batch process of this type inherently gave rise to many disadvantages. One of the major difficulties encountered is the tendency toward formation of large polymer particles or agglomerates. This condition is caused by initial high polymerization rates due to the high initial concentration of catalyst. The polymer agglomerates are sufficiently large and intractable to make agitation and transfer of the reaction mass difficult or impossible.

Another disadvantage accompanying initial addition of the total catalyst charge to the polymerization is the severe limitation on the degree of control which can be maintained over the reaction exotherm. Under these conditions, the initiation of polymerization is accompanied by a rapid exothermic reaction. Although the temperature inside the reactor can be controlled to some extent by resorting to the use of external cooling means or by carefully controlling the input rate of ethylene monomer, such stopgap measures provide disadvantages of and by themselves.

For instance, in the case where external cooling of the reaction vessel is employed, the overall size of the reactor is limited since the cooling capacity becomes a major consideration in apparatus design. Ineffective cooling moreover leads to the creation of a monomer-starved system with attendant uneconomical catalyst efficiency since active catalyst sites in the absence of monomer easily become deactivated.

Still another major disadvantage of initially charging all of the catalyst to the reaction system is the prolonged exposure of all the catalyst to possible chemical contamination or poisoning. The normal reaction time of a batch polymerization is from about 2 to about 4 hours, during which time the active catalyst is exposed to trace contaminants entrained in the monomer feed stream. While it is possible to purify the monomer to a high degree, practical reasons of economy prohibit purification to the point where catalyst contamination by monomer entrained impurities ceases to be a problem.

The quantity of monomer impurity need not be large to adversely effect the catalyst. Even in the amounts normally present in commercially available ethylene monomer, i.e., 10 to 100 p.p.m. of water and 50 to 1000 p.p.m. of oxygen and carbon dioxide, these impurities exhibit a considerable deactivation effect upon catalysts under sustained periods of contact, and lead to non-reproducible reaction times. Experimentally it has also been found that even when the contaminant level is relatively low, the polymer yield is only slightly affected by total catalyst concentration. Rather, other factors remaining constant, the polymer yield is nearly a constant value within the catalyst concentration range of from 1 to 25 millimoles per liter. These experimental observations offer substantial evidence that significant quantities of catalyst are consumed by contamination due to the prolonged exposure in the reaction vessel.

Due to the non-reproducibility of reaction rates from run to run under the conditions of total catalyst single-charge addition, it is difficult to predict at any given time the total solids content of the reacting system, thereby making it difficult to meter in the proper amount of diluent. Frequently therefore difficulty is encountered in providing adequate agitation in the early stages of polymerization at which time proper monomer dispersion is necessary to establish overall high catalyst efficiency.

Finally, the preparation of polymers by batch methods requires that solvent recovery for reuse be carried out by expensive distillation procedures. Distillation is necessitated by the quenching of the polymer slurry with a polar solvent, e.g., an alcohol. If the quenching step is omitted in the batch operation, the polymer becomes discolored during the operation of separating the polymer from the reaction diluent.

I have now discovered, however, a truly continuous method for producing polyethylene which permits the use of the catalyst compositions of copending application Serial No. 647,932, filed March 25, 1957. The catalyst compositions disclosed therein comprise essentially three components; one component being a hydrocarbon-soluble aluminum trihalide, the second component being an organo-metallic compound or a halogen-substituted organo-metallic compound, in which the halogen is directly attached to the metal of a metal selected from the groups II–B, IV–A and V–A of the periodic chart of the elements, and a third component which should be present in only minute amounts based on the weight of the first two components being a hydrocarbon soluble compound of vanadium, or a vanadium compound which can become hydrocarbon soluble by reaction with the other catalyst components.

Aluminum trihalides found particularly effective as the first components are aluminum tribromide and aluminum trichloride. Aluminum trifluoride due to its insolubility generally in hydrocarbons is ineffective. The use of aluminum triiodide as one of the catalyst components is attended by very low yields of polyethylene. It has further been found that the aluminum trihalides are unique in these catalyst compositions and cannot be satisfactorily replaced by other Lewis acids.

The organo-metallic compounds of the second component are exemplified by the organo compounds of the following metals, namely:

| Group II–B— | Group IV–A— | Group V–A— |
|---|---|---|
| Zinc | Germanium | Antimony |
| Cadmium | Tin | Bismuth |
| Mercury | Lead | |

The hydrocarbon portion of these organo-metallic compounds are preferably alkyl or aryl groups, in particular, phenyl groups which generally promote higher polymer yields.

Typical representative organo-metallic compounds useful as the second member of the catalyst composition are as follows; the listing, however, is to be regarded in exemplification and not restriction of the useful compounds: di-n-butyl zinc; dimethyl zinc; di-o-tolylzinc; dibutyl cadmium; diisoamyl cadmium; diphenylmercury; dibenzylmercury; diisoamylmercury; di-n-hexylmercury; ditoly mercury; amyltriphenylgermanium; benzyltriphenylgermanium; butyltriphenylgermanium; hexabenzyldigermane; hexaphenyldigermane; tetra-i-amylgermanium; dibenzyldiethylstannate; diethyldiisobutyltin; diethyldiphenyltin; dimethyldiethyltin; triphenyl tin bromide. Particularly preferred are those organo-tin compounds having the general formula, $SnR_nX_m$, wherein R is an aryl group, X is chlorine or bromine, $n$ has a value of 3 or 4, $m$ is either zero or one, and $m+n$ equal 4.

The third catalyst component, namely a compound of vanadium, is preferably one soluble in an inert hydrocarbon liquid, as for example, benzene, monochlorobenzene, cyclohexane, iso-octane, methylcyclohexane, propane, butane, heptane, n-decane, or alternatively, a compound which can form a hydrocarbon-soluble compound by interaction with the aluminum trihalide.

Suitable hydrocarbon-soluble vanadium compounds include vanadium oxytrichloride, vanadium tribromide, vanadium pentafluoride, and vanadium tetrachloride, the last named being particularly preferred in the process of the present invention and used herein for purposes of illustration.

Compounds of vanadium which form hydrocarbon-soluble products upon reaction with an aluminum halide in the presence or absence of the hydrocarbon are exemplified by vanadium dichloride, vanadium dibromide, vanadium pentoxide and vanadium oxydichloride.

Although vanadium is a transition element, other transition elements cannot be substituted for it in this invention. The use of such metal salts as titanium tetrachloride and zirconium tetrachloride when substituted for the vanadium compound under all other essential conditions of this invention yields no polymer.

Previous attempts to produce polyethylene by a continuous process in a reaction system employing the particular catalyst compositions of the present invention have been unsuccessful. Prior known continuous methods such as that generally employed when the so-called Ziegler catalysts are utilized as the polymerization agents were found to be highly uneconomical and resulted in sporadic polymerization. Typically this method comprised continuously adding a premixed catalyst composition, having a fixed ratio of the individual components, to a reactor along with a suitable solvent medium and ethylene monomer. The reactor was so designed that the ethylene was in contact with the catalyst for a pre-determined time during which period the reacting mixture was being moved toward a discharge port emptying into a quenching pot. As a result active catalyst components were constantly being discharged along with the polymer slurry to the quench pot. In addition the solvent required substantial purification before reuse.

Moreover the substitution of the catalyst compositions comprising an aluminum halide, an organo-metallic compound such as tin tetraphenyl and vanadium compound for Ziegler catalysts may not be successfully accomplished in the continuous process just described. In attempting to employ a catalyst composition having the high weight ratio of aluminum halide to organo-metallic compound required in such a process, the organo-metallic compound is disproportionately consumed, resulting in due course to the total absence of said compound in the reaction mixture. The aluminum halide compound at this point is sufficiently reactive in the presence of ethylene monomer so that the subsequent introduction of small quantities of organo-metallic compound causes an extremely rapid polymerization rate which inevitably causes the formation of large polymer aggregates or clumps. This well defined spurt in polymerization rate is followed by a cessation of reaction until another quantity of organo-metallic compound is introduced and the cyclic sporadic polymerization is again initiated.

According to the present invention ethylene is polymerized by a process which includes the steps of continuously feeding ethylene monomer into a reaction vessel containing an initial charge of a suitable inert hydrocarbon or halogen substituted hydrocarbon solvent for said ethylene; continuously and simultaneously feeding into the reactor addition solvent, an organo-metallic compound, an aluminum halide, and a hydrocarbon-soluble vanadium compound, the components being present in weight ratios such that the concentration of the organo-metallic component at any given time is significantly greater than the concentration of the aluminum halide and the vanadium compound; continuously removing from the reactor a portion of the continuously formed slurry comprising ethylene homopolymer, unreacted and soluble organometallic compound, and insoluble catalyst residues; continuously filtering the slurry or otherwise separating the solids from the liquid portion in an inert atmosphere; and recycling the liquid portion comprising solvent and soluble organo-metallic compound to the reactor through a mass of said organo-metallic compound in solid form to establish substantially the same concentration of dissolved organo-metallic compound in the recycled solvent as in the solution in the reactor.

By way of a more detailed explanation of my novel process in which particular compounds typical of those found suitable as components of the reaction mixture are employed for purposes of better illustration, the following stepwise description is set forth. Reference is also made hereinafter to the drawings in which.

Figure 1:
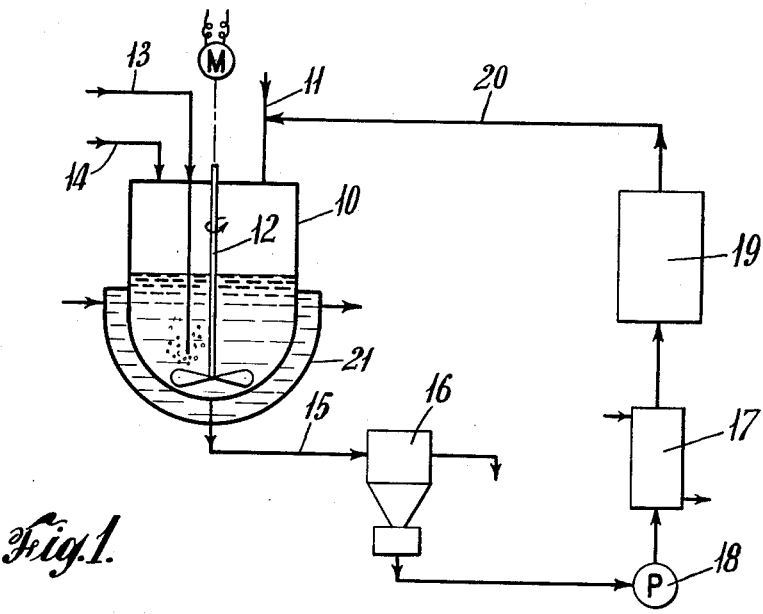
FIG. 1 is a schematic representation of one method of carrying out the process of the present invention.

In general, the reactor is charged initially with a solvent, such as cyclohexane, and an organo-metallic compound, for instance tin tetraphenyl in an amount of from about 0.25 millimole to about 17.5 millimoles per liter of solvent. Preferred concentrations are from about 1.25 millimoles to about 12.5 millimoles of the organo-metallic compound per liter. A solution of aluminum trihalide, such as $AlCl_3$, and a vanadium compound, such as $VCl_4$, is formed by dissolving from about 0.75 millimole to about 45 millimoles of the aluminum trihalide and from about 1 to 100 milligrams of the vanadium compound per liter of the solvent at about 70° C. This solution is added usually at the rate of between 0.1 and 2 liters per hour to the closed reactor through an entry provided therefor. The preferred concentration of aluminum trihalide is from about 2.25 millimoles to about 20 millimoles per liter of solvent. A concentration of from about 2 to about 10 milligrams per liter of solvent, i.e., a trace amount, of the vanadium compound is preferred. Ethylene is fed into the reactor in an amount commensurate with the quantity of solvent originally charged into the reactor and commensurate with the quantity of catalyst being employed. The rate of feed-in of ethylene is, of course, not narrowly critical, but it has been found that a rate of about 1 to 4 liters per minute per liter of cyclohexane give excellent results. The temperature of the reaction is maintained at from about 20° C. to about 100° C., the range of from 65° C. to 75° C. being generally preferred. Portions of the slurry of polymer and solvent together with unreacted organo-metallic compound and insoluble aluminum and vanadium compounds formed during the reaction are continuously withdrawn from the reactor. The withdrawn portions are fed to an apparatus such as a centrifuging, filtering, or other suitable device designed to separate the solvent and unreacted dissolved organo-metallic compound from the solid material and return the solvent and solute to the reactor. Before re-entering the reactor, the solvent mixture is first passed through a vessel or tower packed with particles of the organo-metallic compound while the temperature of the mixture is maintained at a predetermined level determined by the solubility characteristics of the organo-metallic compound in the particular solvent employed, the residence time of the mixture in the vessel or tower and upon the temperature as it enters the packed tower. This operation permits the concentration of the organo-metallic compound in the solvent to be raised to the pre-reaction level and to be carefully controlled.

For example, it has been found that when cyclohexane is passed through finely divided, solid, tin tetraphenyl at a temperature of between 37° C. and 45° C. a saturated solution containing about 2 grams tin tetraphenyl per liter of cyclohexane can be maintained. The temperature of the solvent can, of course, be maintained, as it passes through the column, at various different temperatures whereby a wide range of tin tetraphenyl or other organo-metallic compound concentrations can be achieved depending on the concentration of a saturated solution at the chosen temperature. Likewise, solvents other than cyclohexane will ultimately yield a different concentration of organo-metallic compound in the solvent, which concentrtaion level can be adjusted by the temperature or residence time of solvent in the vessel.

The reactor vessel may comprise any suitable closed vessel having provisions for introduction of reactants and withdrawal of the polymer slurry and in addition be capable of being sealed to prevent the entry of atmospheric contaminants.

The solubility of the organo-metallic compound in the reaction solvent and the recycling of the solvent plus organo-metallic compound are vital factors, and are the primary reasons why the present invention produces unexpected improvements far beyond those inherent in the modification of a batch process to obtain continuous performance. The surprising improvement over batch type operation can best be shown by reference to FIGS. 2 and 3 of the drawings.

Figure 2:
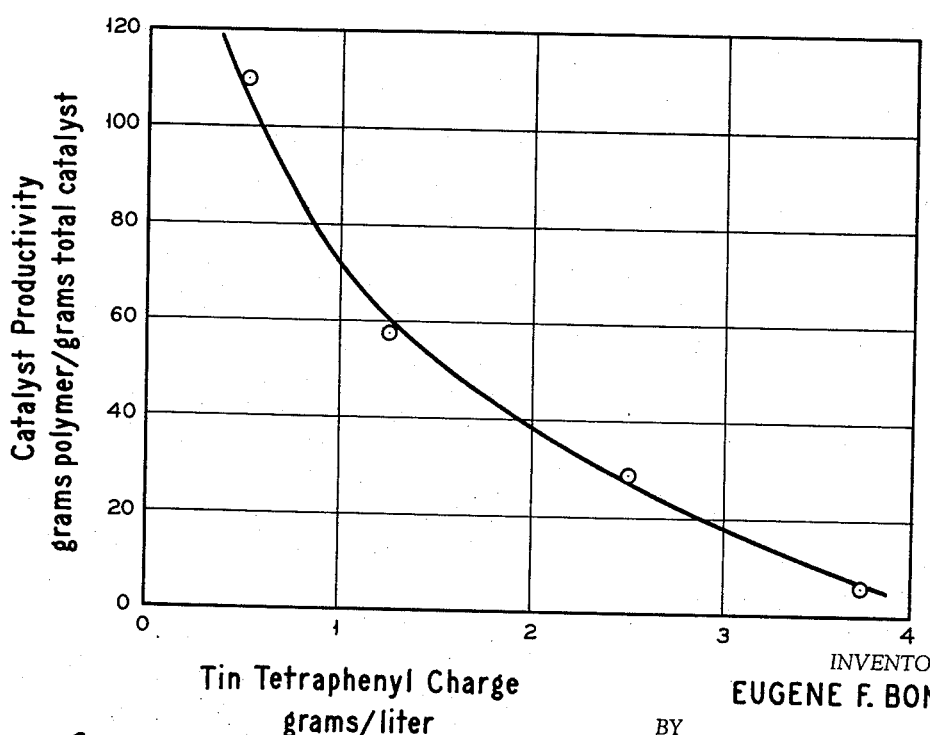
FIG. 2 is a graph showing catalyst productivity as a function of initial tin tetraphenyl charge.

FIG. 2 summarizes the effect of initial concentration of tin tetraphenyl on catalyst productivity in polymerizations carried out with a fixed concentration of $AlCl_3$ and $VCl_4$. This shows that the maximum productivity, as indicated by a ratio of grams of polymer produced to grams of total catalyst of greater than 100:1, is achieved at tin tetraphenyl concentrations of about 0.5 gram per liter of cyclohexane.

The optimum concentration of organo-metallic compound in the reaction mixture is not, however, determined by catalyst productivity considerations alone. As previously mentioned, large and intractable polymer agglomerates which made agitation of the reaction mass very difficult, constituted a serious problem in designing any continuous process employing the catalyst compositions used in the present invention. I have found, however, that excellent control of agglomerate size can be maintained by controlling the rate of addition of, for instance, $AlCl_3$ and $VCl_4$ to a solution containing a molar excess of tin tetraphenyl over the amount of $AlCl_3$ present.

This procedure is a considerable departure from batch operation in that the instantaneous weight ratio of aluminum trihalide to organo-metallic compound is extremely low. At all times the vanadium compound need be present only in trace amounts. By the term trace amount is meant a quantity of vanadium compound of the order of magnitude of about 0.1 milligram per liter of reaction diluent. For instance, in a typical reaction containing a concentration of tin tetraphenyl of 1 gram per liter of reaction diluent, the $AlCl_3$ can be fed at the rate of 0.006 gram $AlCl_3$ per minute per liter of reaction diluent to sustain the reaction at a rate of 0.75 gram of polymer per minute per liter of original reaction diluent. The reaction begins in less than a minute under these conditions, and the reaction rate remains essentially constant so long as the initial tin tetraphenyl concentration is maintained. If at any instant during the polymerization the $AlCl_3$ feed is stopped, the polymerization also ceases almost instantaneously. This indicates that the $AlCl_3$ is being consumed at the rate at which it is being fed into the reactor. Resumption of feed-in of aluminum chloride and vanadium compound causes the polymerization to proceed at precisely the same rate as before, which indicates that the unused tin tetraphenyl is not affected during the cessation of reaction nor is it readily susceptible to decomposition from the trace contaminants in the monomer feed.

Figure 3:
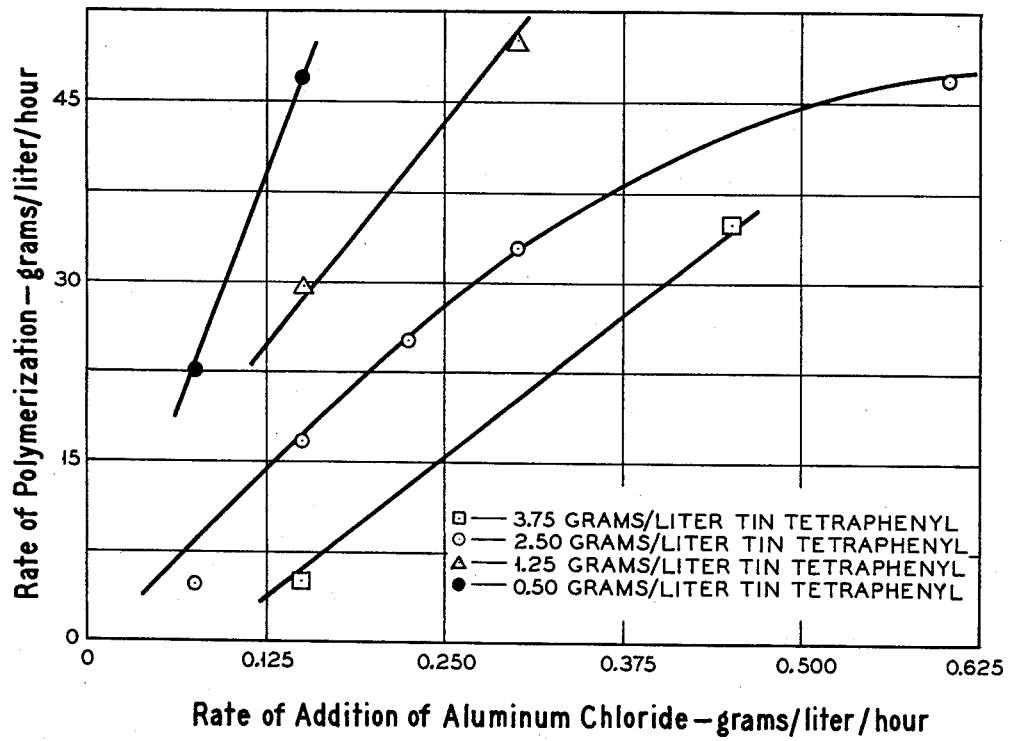
FIG. 3 is a graph showing polymerization rate as function of the additional rate of aluminum chloride for several different quantities of initially charged tin tetraphenyl.

FIG. 3 shows the variance in the rate of polymer formation in a typical operation with the rate of addition of aluminum chloride-vanadium tetrachloride solution at four different initial concentration values for tin tetraphenyl. In all cases the vanadium tetrachloride was added at a fixed rate of 2 to 3 milligrams per liter of reaction diluent per hour. It can readily be seen that the rate of polymer formation decreases sharply as the initial charge of tin tetraphenyl is increased for any given constant rate of addition of $AlCl_3$. Based on considerations solely of polymerization rate therefore, a batch operation in which tin tetraphenyl and aluminum chloride were both initially charged to the reactor, the most economical production rate does not begin until a large part of the tin tetraphenyl is consumed.

Under the conditions of the reaction procedure described above, rate of polymer formation is in direct proportion to the $AlCl_3$ feed rate to the reactor for any given concentration of tin tetraphenyl. Since the aluminum chloride component is instantaneously consumed in the polymerization reaction, the undue exposure of the catalyst component to contamination is prevented. This is a major improvement over the old procedure since the expensive catalyst components are efficiently utilized in inducing polymerization.

The polymerization rate is easily controlled by the rate of addition of the aluminum trihalide component. This allows the reaction to proceed at a preselected moderate rate to yield a controlled polymer particle size at any desired reaction temperature. Control of the exothermic temperature's rise precludes the possibility of excessive temperatures that drastically reduce the catalyst productivity. Furthermore, since the exothermic temperature rise can be controlled internally, the overall reactor size is not limited by the extent of its external cooling capacity. Reaction autoclaves as large as 200 gallons in capacity have been found to be quite satisfactory.

Therefore, all of the features that were inherently undesirable in prior known systems have been eliminated by the present new method in which the following advantageous features are incorporated:

(1) A polymer yield directly proportional to the catalyst concentration added;
(2) Internal control of the reaction mixture;
(3) Control of polymer particle size;
(4) Catalyst components are used exclusively for polymerization rather than being destroyed by thermal decomposition or trace contamination;
(5) Recovery of the solvent and the most expensive catalyst component without purification;
(6) Polymerization rate under a given set of conditions is constant, therefore diluent can be added at predictable rates to control the overall solids content in the reactor; and
(7) The filtration step removes essentially all the hydrocarbon soluble species leaving only the hydrocarbon insoluble species for removal during the clean-up.

The recycling of the inert solvent following removal of the polymer mass provides a means for using the organo-metallic compound in the most efficient manner and still maintain the excess concentration of this compound in the reactor in order to control resin particle size. Such a recycle operation is not possible in the so-called Ziegler system due to the insolubility of the active catalyst.

A specific embodiment of my invention is described in detail below in connection with FIG. 1 of the drawings.

Referring to the drawing, the reactor 10 equipped with a temperature controlling jacket 21, is charged initially through line 11 with cyclohexane and tetraphenyl tin. As the stirring means 12 agitates the solvent medium, gaseous ethylene is introduced into the reactor through line 13, the exit opening of which is positioned below the surface of the solvent medium in the reactor, causing ethylene to bubble up through the solvent. Simultaneous with the addition of the ethylene, a prepared cyclohexane solution of aluminum halide and the vanadium compound serving as the catalyst activator is introduced in a drop-wise manner into the reactor through line 11 until the desired ratio of the components of the catalyst composition has been attained. A slight positive pressure of dry nitrogen gas or dry ethylene is maintained over the reacting mixture to avoid atmospheric contamination. The nitrogen is introduced through line 14. After a sufficient reaction period has lapsed during which the solids content of the reaction mixture has reached a predetermined amount, small portions of the slurried polyethylene in the solvent medium are drawn off at short intervals or continuously by means of a liquid level device (not shown) through line 15 and fed to centrifuge 16 where the solid polymer and the insoluble catalyst residues are separated in an inert atmosphere, such as nitrogen, from the solvent medium containing dissolved unreacted tin tetraphenyl and other soluble tin compounds produced during the polymerization reaction. Any means suitable for separating the polymer and inorganic catalyst residue from the solvent may, of course, be substituted for the centrifuge. A simple filtration apparatus, for instance, will give equally good results. The solvent and its solute are continuously withdrawn from the separating means and passed through a heat exchanger 17 by means of a metering pump 18. The heat exchanger may either heat or cool the solvent depending entirely upon the temperature required for the solvent as it passes through the heat exchanger to column 19 which is packed with particulate tin tetraphenyl. The temperature of the solvent as it passes through the packed column determines in large measure the concentration of tin tetraphenyl in the solvent as it re-enters the reactor 10. Simultaneous with re-entry of the purified and reconstituted solvent medium into the reactor 10 through line 20, ethylene and the other two components, namely the Lewis acid compound and the vanadium compound, are metered into the reactor through lines 13 and 11, respectively, in amounts corresponding to the tin tetraphenyl in the solvent according to a predetermined ratio. At this point a truly continuous process is in operation.

The following examples are given to illustrate the invention in more detail.

*Example I*

An apparatus similar to that shown in FIG. 1 of the drawing was used to carry out a continuous ethylene polymerization reaction. The capacity of the reactor was approximately 5 liters and was so designed to permit intermittent withdrawal of polymer slurry when the solids content had risen to about 5 percent. The catalyst bed consisted of a 60 cm. column having a 19 mm. bore and was packed with alternate layers of particulate tin tetraphenyl and glass wool. The catalyst bed was charged with 50 grams of tin tetraphenyl. Cyclohexane was charged to the reactor and to the recycle pump and filter apparatus, the total amount of cyclohexane being about 8 liters. The reactor was heated to about 60° C. and the recycle pump was started. The flow of cyclohexane to the packed column (catalyst bed) was maintained at 37° C. to 45° C. so that at steady state conditions the concentration of tin tetraphenyl in the reactor was about 2 grams per liter of cyclohexane solvent. As soon as steady state conditions were attained, ethylene was fed into the reactor at the rate of 3 liters per minute and a solution comprising aluminum trichloride and vanadium tetrachloride dissolved in cyclohexane in the ratios of 0.9 gram of $AlCl_3$ and 10 mg. $VCl_4$ per liter of solvent was added to the reactor in a dropwise manner at the rate of about 1 liter per hour. Polyethylene had formed when about 100 cc. of this catalyst solution had been added and a slight rise in temperature was observed. The polymerization proceeded for about 14 hours during which time portions of polymer slurry were removed at short intervals and passed into the filtering apparatus where the polymer was removed and the catalyst containing unreacted tin tetraphenyl and other soluble tin compounds formed during the polymerization was recycled through the catalyst bed to the reactor. The concentration of tin tetraphenyl was maintained at about 2 grams per liter. Polymer yield was 1085 grams and it had a melt index of 2.34 as determined when 10 times the standard pressure was used on the melt index piston according to ASTM test method 1238–52T.

*Example II*

A second polymerization was carried out using the same apparatus as in Example I. The catalyst bed maintained at about 50° C. was charged with 10 grams of tin tetraphenyl and the system was charged with 6 liters of cyclohexane. The recycle pump was started and continued until steady state conditions were established. At this point ethylene was fed into reactor at the rate of 3 liters per minute and at the same time a cyclohexane solution of $AlCl_3$ and $VCl_4$ was added at a rate whereby 0.6 gram $AlCl_3$ per hour per 700 cc. of solvent and 10 mg. $VCl_4$ per hour per 700 cc. of solvent reached the reaction mixture. Polymer formation began in less than 5 minutes at a reaction temperature of 60° C. Portions of polyethylene slurry were then intermittently fed to the filtering means where the solids were removed and the cyclohexane-tin tetraphenyl system was recycled through the catalyst bed to the reactor. After 11 hours, 702 grams of polyethylene having a melt index, as determined in Example I, of 0.8, were removed. The catalyst productivity based on total catalyst was 50:1. The ratio of cyclohexane solvent to polymer was 13.2:1. The ash content of the dried, unquenched, unwashed polymer was 0.79 percent. Emission spectra data on the ash revealed an Al/Sn ratio (as metal) of 10:0.1 while the original charged ratio (as metal) was 1:2.78, thereby showing that most of the excess tin tetraphenyl catalyst and other tin compounds remained in the solvent and is recovered.

*Example III*

A polymerization was carried out according to the procedure in Example II. The catalyst bed temperature was maintained at 20° C. and the reaction was sustained for 5 hours at a temperature of about 65° C. to 70° C. producing 318 grams of polyethylene. The catalyst productivity was 59:1 based on total catalyst charged.

The foregoing examples are illustrative only and are not intended as limitations on the scope of the present invention.

What is claimed is:

1. A process for polymerizing ethylene which includes the steps of forming a reaction mixture by continuously adding ethylene monomer, a hydrocarbon soluble aluminum trihalide, and a trace amount of a vanadium compound to a reaction medium maintained at a temperature of from about 20° C. to about 100° C. and comprising a solution of an inert organic solvent having dissolved therein an organo-metallic compound of a metal selected from group II–B, IV–A and V–A of the periodic system of the elements in an amount of about 0.25 to about 17.5 millimoles per liter, the addition rate of said aluminum trihalide being from about 0.075 millimole to about 90.0 millimoles per hour per liter of said reaction medium, and the rate of addition of said ethylene being from about 1 to about 4 liters per minute per liter of said reaction medium; continuously removing a portion of said reaction mixture; mechanically separating the solids from said removed portion in an inert atmosphere; and recycling the liquid phase of said removed portion, without purification thereof, to the reaction mixture through a mass of said organo-metallic compound in the solid state whereby the concentration of dissolved organo-metallic compound in the reaction mixture is maintained substantially constant.

2. Process for polymerizing ethylene according to claim 1, in which the reaction medium is maintained at a temperature of about 65° C. to about 75° C.

3. A process for polymerizing ethylene which includes the steps of forming a reaction mixture by continuously adding ethylene monomer, and aluminum halide of the group consisting of aluminum trichloride and aluminum tribromide, and a trace amount of vanadium tetrachloride to a reaction medium maintained at a temperature of about 20° C. to about 100° C. and comprising a solution of an inert hydrocarbon solvent having dissolved therein an organo-metallic compound of a metal selected from the group consisting of tin, bismuth, and mercury, in an amount of about 1.25 millimoles to about 12.5 millimoles per liter, the addition rate of said aluminum trihalide being from about 0.25 millimole to about 45 millimoles per hour per liter of said reaction medium, and the rate of addition of said ethylene being from about 1 to about 4 liters per minute per liter of said reaction medium; continuously removing a portion of said reaction mixture, mechanically separating the solids from said removed portion in an inert atmosphere; and recycling the liquid phase of said removed portion, without purification thereof, to the reaction mixture through a mass of said organo-metallic compound in the solid state whereby the concentration of dissolved organo-metallic compound in the reaction mixture is maintained substantially constant.

4. Process for polymerizing ethylene according to claim 3 in which the aluminum halide is aluminum trichloride, and the organo-metallic compound is a compound of tin.

5. Process for polymerizing ethylene according to claim 3 in which the aluminum halide is aluminum trichloride, and the organo-metallic compound is a compound of bismuth.

6. Process for polymerizing ethylene according to claim 3 in which the aluminum halide is aluminum trichloride, and the organo-metallic compound is a compound of mercury.

7. Process for polymerizing ethylene according to claim 3 in which the organo-metallic compound is a compound of tin having the general formula $SnR_nX_m$, wherein R is an aryl group, X is a halogen selected from the group consisting of chlorine and bromine, $n$ has a value of at least 3, and $n+m$ has a value of 4.

8. Process for polymerizing ethylene according to claim 7 in which the organo-metallic compound is tin tetraphenyl.

References Cited in the file of this patent

UNITED STATES PATENTS

| | | |
|---|---|---|
| 2,845,414 | Schutze | July 29, 1958 |
| 2,846,427 | Findlay | Aug. 5, 1958 |
| 2,862,917 | Anderson et al. | Dec. 2, 1958 |
| 2,889,314 | Fritz | June 2, 1959 |
| 2,900,374 | Aries | Aug. 18, 1959 |
| 3,004,086 | Moon | Oct. 10, 1961 |

FOREIGN PATENTS

| | | |
|---|---|---|
| 1,137,459 | France | June 14, 1957 |